Figure 1:
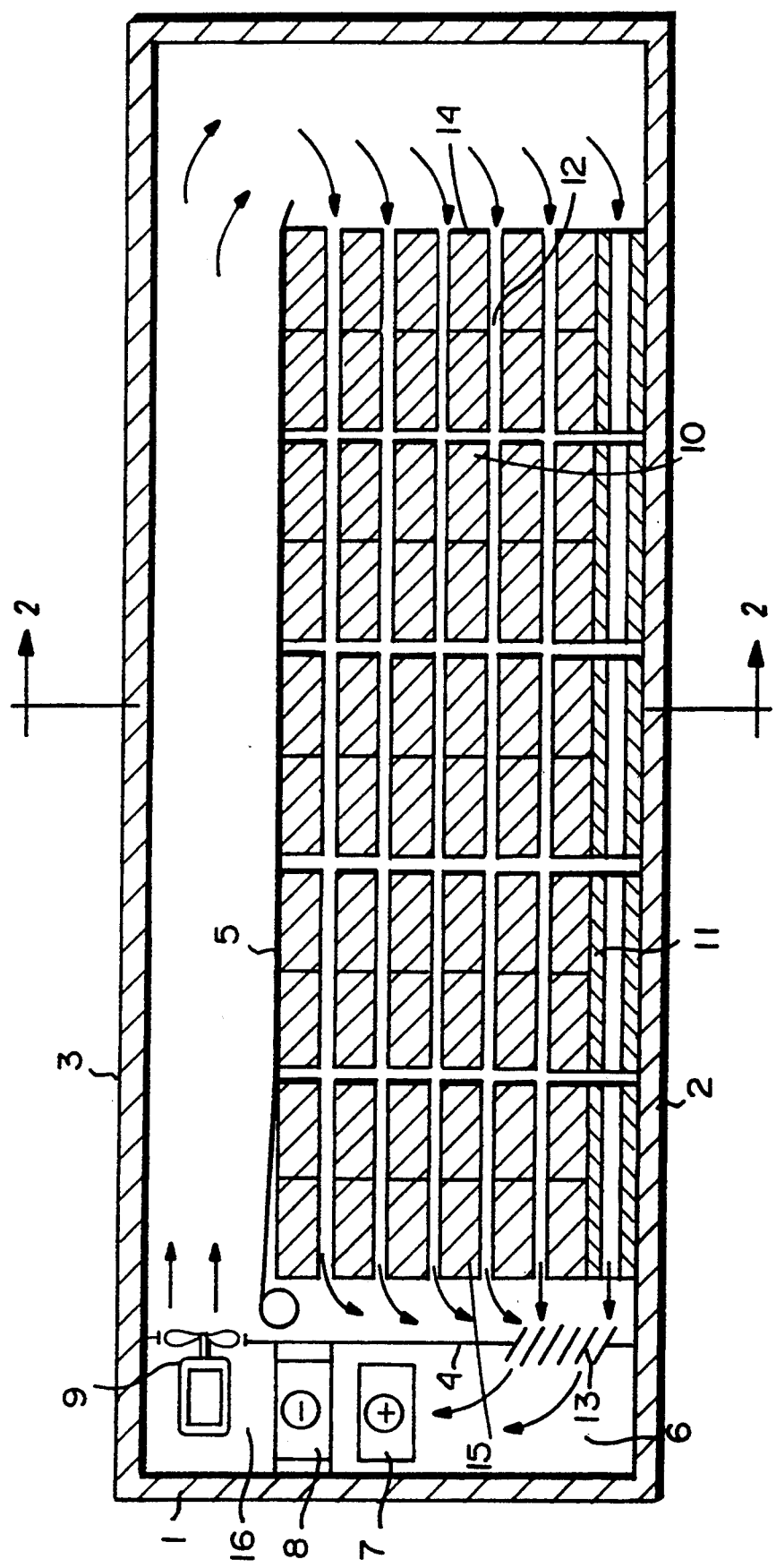

United States Patent [19]
Kristensen

[11] Patent Number: 5,441,098
[45] Date of Patent: Aug. 15, 1995

[54] SYSTEM FOR DEFROSTING FROZEN PACKED PRODUCTS

[75] Inventor: Jean J. Kristensen, Holstebro, Denmark

[73] Assignee: Morep Food Process Systems Limited, West Yorkshire, England

[21] Appl. No.: 894,765

[22] Filed: May 7, 1992

[30] Foreign Application Priority Data

Sep. 7, 1989 [DK] Denmark .................. 4419/89
Sep. 4, 1990 [WO] WIPO ............... PCT/DK90/00229

[51] Int. Cl.⁶ .................. F25B 29/00; A23L 3/365
[52] U.S. Cl. .......................... 165/17; 165/61; 165/64; 219/400; 99/483; 426/232; 426/524; 126/21 A; 236/15 BB
[58] Field of Search ............ 165/61, 64, 17; 219/400; 99/483; 426/232, 524, 231; 126/21 A; 236/78 D, 15 BB; 62/62, 208

[56] References Cited

U.S. PATENT DOCUMENTS

| | | | |
|---|---|---|---|
| 3,097,836 | 7/1963 | Beggs et al. | 236/15 BB |
| 3,266,725 | 8/1966 | Garrison et al. | 236/15 BB |
| 3,818,977 | 6/1974 | Lohr | 165/61 |
| 4,547,977 | 10/1985 | Tenedini et al. | 236/78 D |
| 4,812,622 | 3/1989 | Takeda et al. | 165/61 |
| 4,841,111 | 6/1989 | Kokkeler et al. | 219/10.55 B |
| 4,898,741 | 2/1990 | Heide | 426/524 |

FOREIGN PATENT DOCUMENTS

| | | |
|---|---|---|
| 0298063 | 1/1989 | European Pat. Off. |
| 2422632 | 12/1975 | Germany |
| 2044906A | 10/1980 | United Kingdom |

*Primary Examiner*—John K. Ford
*Attorney, Agent, or Firm*—Nixon & Vanderhye

[57] ABSTRACT

Method of thawing deep-frozen packed products in which a relatively dry heated airflow sweeps around the product for a period of time, the duration of which is determined by the temperature measured in the middle of the product. The heat flow rate imparted to the airflow is controlled in dependence on the surface temperature of the product at the place where the product is expected to reach the highest temperature.

1 Claim, 2 Drawing Sheets

SYSTEM FOR DEFROSTING FROZEN PACKED PRODUCTS

The invention relates to a method of thawing out a deep-frozen, packed product in which a relatively dry heated airflow is made to sweep around the product for a period of time, the duration of which is determined by the temperature measured in the middle of the product. Moreover, the invention relates to a thawing-out plant for carrying out the method.

Plants and methods of thawing deep-frozen products are known in various designs. The disclosure of EP-A-0 298 063 thus deals with a thawing-out method whereby air sweeping around the product is kept saturated with water vapour by adding atomized water at a specific temperature, thereby also controlling the temperature of the air. The thawing-out is stopped when the temperature in the middle of the product has risen to a predetermined value.

However, it is not all types of products that can be thawed out by means of humid air. Such a method causes water to condense on the product. This is desirable in certain cases (thawing out unpacked fish or meat), but in other cases it cannot be allowed, e.g. when thawing out products packed in materials soluble in water. GB patent No. 2 044 906 A thus discloses such a method according to which the temperature of the air sweeping around the product is controlled and thereby kept at a value a few centigrades above the temperature of the product in order to avoid moisture condensation on the product.

Various other systems and methods of thawing frozen products are known. The common features are that the air sweeping around the product is controlled to a larger or smaller degree in respect of temperature and water content and that the thawing is interrupted after a predetermined period or when the temperature in the middle of the product (the core temperature) has risen a predetermined value.

With respect to the thawing of a frozen product there are various demands to consider: A frequent interest is taken in that the thawing is effected as quickly as possible whereas, on the other hand, the temperature of the product must not locally rise so much that bacteria get favourable conditions of growth, thereby damaging the product.

The purpose of the invention is to comply with said requirements as well as possible.

This is obtained according to the invention with a method of the above mentioned type which differs from the prior art in that the heat flow rate imparted to the air is controlled in dependence on the surface temperature of the product in the place where the product is expected to reach the highest temperature.

According to the invention this method may be carried out in a thawing plant in which a flow duct is provided through which the air may be recycled by means of a blower past a heating assembly and past a lot of products to be thawed which are piled and spaced apart along the flow duct and where, according to the invention, a temperature sensor is disposed on an upstream surface of a product farthest upstream in the pile, and a microprocessor receives signals from the temperature sensor and emits a control signal to the heating assembly.

In carrying out the method according to the invention a temperature sensor is arranged in the place where the lot of products are expected to attain the highest surface temperature. Experiments have surprisingly shown that it is possible to control the power supplied to the heating unit so that the measured surface temperature is substantially kept at a desired value that is just as low or high to surely prevent the product from becoming tainted. During the thawing-out heat flows from the surface of the products towards their centre, following which the temperature in the middle rises. Due to the fact that the surface temperature is maintained, at any rate in one place (at the temperature sensor), the temperature difference forcing the heat towards the centre of the product will fall. The flow of heat into the products will thus be lessened and the need for power supplied to the heating assembly will thus fall. By the invention it is thus obtained that the highest possible heat flow rate is continuously supplied without damaging the products, thereby obtaining the quickest possible thawing. During the thawing-out a temperature sensor is, moreover, arranged, sensing the temperature in the middle of the product of the lot expected to be the coldest during defrosting. When this core temperature has risen to a preset value the thawing is stopped.

Figure 2:
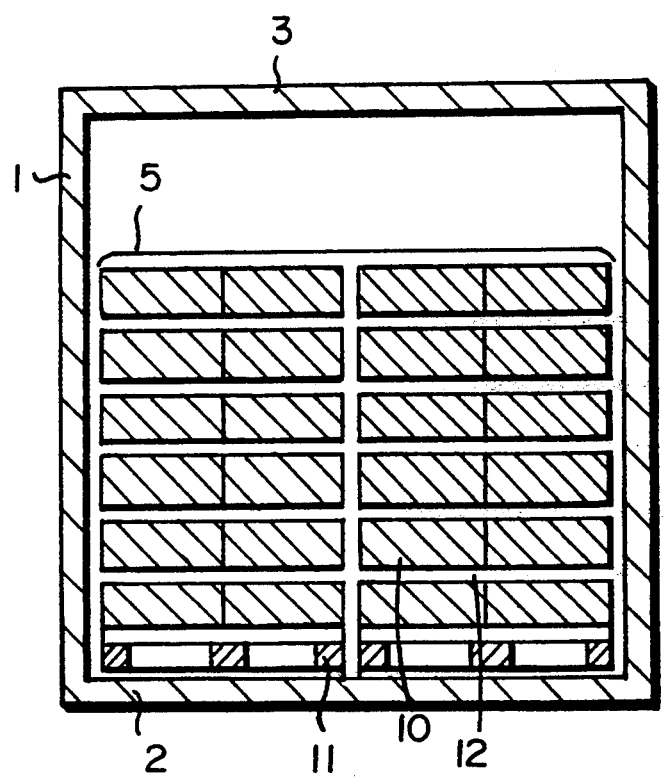

The invention will now be explained in detail by means of an example with reference to the drawings, in which FIG. 1 shows a section through a thawing plant according to the invention, and FIG. 2 is a section along the line II—II in FIG. 1.

The thawing plant illustrated in FIG. 1 includes a closed thawing cabin with insulated walls 1, floor 2 and ceiling 3. A partition wall 4 and a roller blind 5 constitute in common a flow duct for the air in the thawing cabin with a compartment 6 at one end of the cabin in which the air flows past a heating surface 7 and a cooling surface 8 and past a ventilator 9 driving the airflow. The air leaves compartment 6 at the top and flows across roller blind 5 to the other end of the cabin. The products 10 to be thawn in the cabin are piled on pallets 11 at intervals 12 between the individual products in such a manner that each individual product may be swept over at least both of the horizontal surfaces.

After having attained the free end of the roller blind the airflow turns down and penetrates the pile of products 10. After having penetrated the pile of products, the air flows through a grating 13 at the lower part of partition wall 4 and is subsequently recycled to compartment 6.

The use of the thawing cabin provides for piling the products to be thawed, for instance as shown in FIGS. 1 and 2. The products may be meat, fish or vegetables that are packed, for instance in cardboard boxes. A first temperature sensor 14 is arranged on the upstream surface of one of the products that are farthest upstream in the pile and a second temperature sensor 15 is arranged in the middle of one of the products at the downstream end of the pile.

A microprocessor not shown receives signals from said two temperature sensors 14 and 15. Power in the form of a current of electricity, hot water or vapour is imparted to heating surface 7 during thawing. The supplied power is controlled by the microprocessor so that the surface temperature measured by temperature sensor 14 is kept at a predetermined value depending on the actual type of product and programmed in the microprocessor.

The microprocessor stops the thawing, i.e. interrupts the power supply to the heating surface 7 when the core temperature measured by the temperature sensor 15 has risen to a preset value depending on the product type and programmed in the microprocessor. The thawing typically takes 8 to 10 hours.

By controlling the thawing as outlined, from the values measured by temperature sensors 14 and 15 it is ensured, on one hand, that the surface temperature of the products will nowhere rise above the preset upper limit of what the actual product type can endure without becoming tainted and, on the other hand, that all products, even in their centre, have attained a desired minimum temperature.

A third temperature sensor 16 is disposed in the flow duct after the heating and cooling surfaces 7 and 8 and before the pile of products. After the thawing has been completed a suitable storage temperature in the thawing cabin is maintained in that the microprocessor compensates for heat leakage from the thawing cabin to the surroundings by controlling the flow rate of heat removed through the cooling surface 8 so that the air temperature measured by the third temperature sensor 16 is maintained at a predetermined value. The storage temperature ranges between −10° C. and 15° C. dependent on the type of product.

During thawing the products are swept over at an air velocity in the range between 4 to 6 m/s while the air velocity during storing is lowered to 1 to 2 m/s.

During thawing the microprocessor is monitoring the three temperature sensors, inter alia with the view of controlling whether the expected courses of temperature are followed. If this is not so, an alarm sounds. The alarm will thus be sounded if for instance the first temperature sensor 14 has not been correctly mounted and therefore measures the air temperature instead of measuring the surface temperature.

I claim:

1. A thawing plant for thawing out deep-frozen packed products (10) that are piled with interspaces (12) and including a heating assembly (7), a blower (9) and means (4, 5) to provide a flow duct in which the products are piled along part of said duct, characterized by a temperature sensor (14) disposed on an upstream surface of a product farthest upstream in the pile and a microprocessor which receives a signal from the temperature sensor (14) and emits a control signal to the heating assembly (7).

* * * * *